S. R. KENYON.
Corn Husker.
No. 68,085. Patented Aug. 27, 1867.
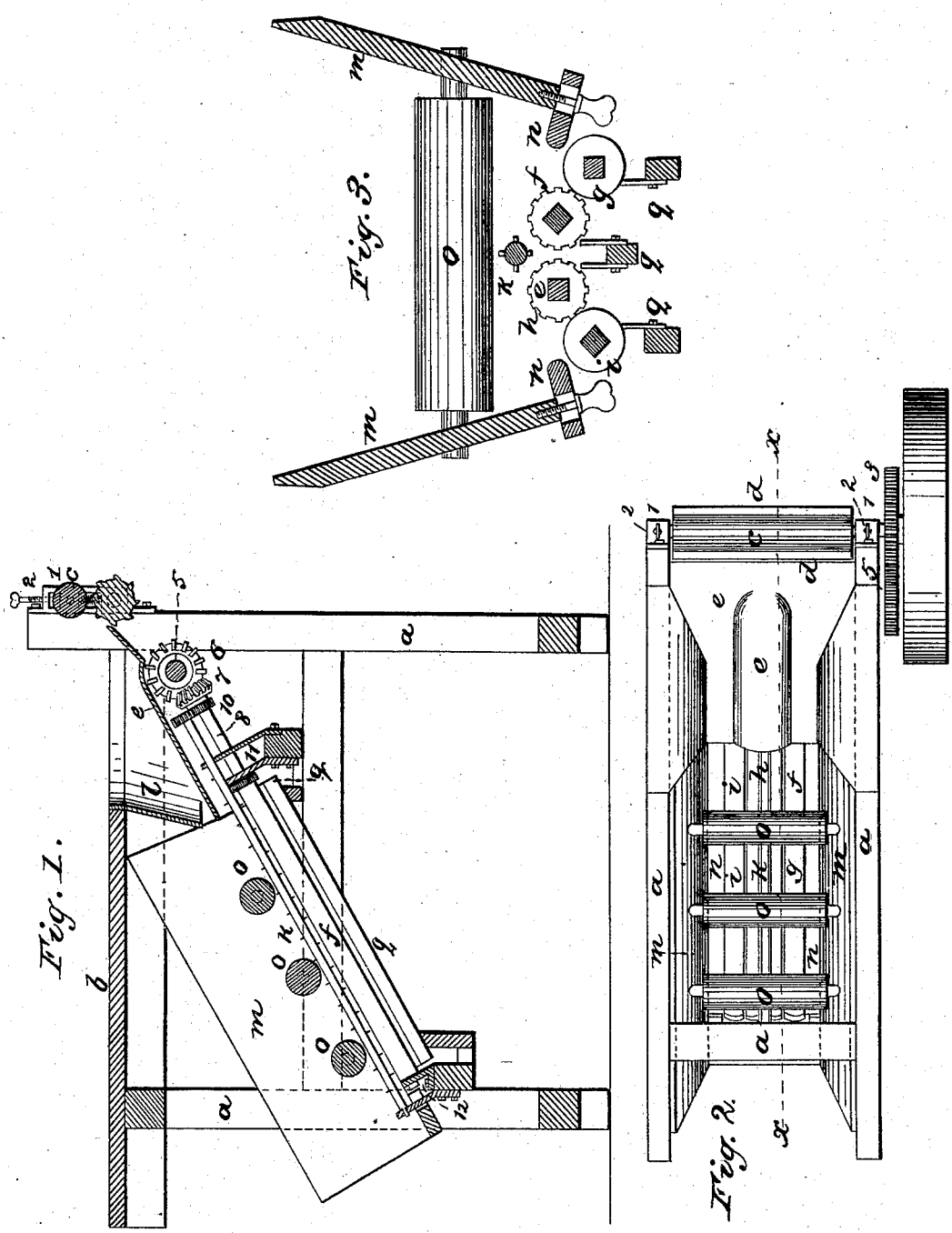

United States Patent Office

SILAS R. KENYON, OF GREENVILLE, RHODE ISLAND, ASSIGNOR TO HIMSELF AND MILTON C. JEFFERS, OF NEW YORK, N. Y.

Letters Patent No. 68,085, dated August 27, 1867.

IMPROVEMENT IN MACHINE FOR PICKING AND HUSKING CORN.

The Schedule referred to in these Letters Patent and making part of the same.

TO ALL WHOM IT MAY CONCERN:

Be it known that I, SILAS R. KENYON, of Greenville, in the county of Providence, and State of Rhode Island, have invented, made, and applied to use, a certain new and useful Improvement in Machinery for Picking and Husking Corn; and I do hereby declare the following to be a full, clear, and exact description of the said invention, reference being had to the annexed drawing, making part of this specification, wherein—

Figure 1 is a vertical longitudinal section of my machine.
Figure 2 is a plan with the table removed; and
Figure 3 is a cross-section at the line $x\ x$, fig. 1.
Similar marks of reference denote the same parts.

Corn-huskers have heretofore been made with horizontal elastic rollers to pull off the husks, and inclined metallic rollers have been used for the same purpose, but in practice difficulties are experienced which my machine has been devised to overcome.

The nature of my said invention consists in a pair of rollers that grasp and draw along the stalk and strip it from the ears which fall into a hopper so shaped as to direct the ears upon the husking-rollers, over which they travel endwise as the husk is stripped off.

I construct my machine so that the ear of corn cannot become clogged in the machine, neither can it escape unhusked, and I arrange my machine so that it is adapted to large or small ears of corn; and the husking is effected by inclined rollers having elastic surfaces and grooves or corrugations to more effectually seize the husks and strip them from the ear.

In the drawing, $a$ is the frame of the machine; $b$, the table on which the corn-stalks are laid and fed in between the roller $c$ and cylinder $d$ that draw said stalk through but break off the ears of corn so that they fall away into the hopper $e$. The roller $c$ is set in yielding journal-boxes 1 1, with adjusting-screws 2 2 to regulate the extent of opening and prevent the same being such as to allow of the ears drawing in. The cylinder $d$ is made of cast iron, with longitudinal ribs that serve to break up the corn-stalks, and also insure the breaking of the stalk at the ear, so that the ear will be picked off the stalk and fall as aforesaid. The cast-iron ribbed cylinder is found practically to effect the separation of the ears from the stalk, and the expensive cylinders heretofore employed are dispensed with. The cylinder $d$ is driven by competent power, and by the gears 3 4, shaft 5, and mitre-wheels 6 and 7. A revolving motion is given to the shaft 8 of the husking-roller $f$, and from the shaft 8 the other rollers $g\ h\ i$ and bar $k$ receive rotation through the gears 9 and 10, and the rollers are sustained by and revolve in the supports 11 and 12. The rollers $f$, $g$, $h$, and $i$ are each made of a metal bar, over which is a rubber roller. The surfaces of the rollers $f$ and $h$ are to be grooved or corrugated; the rollers $g$ and $i$ are plain. The gearing that rotates the husking-rollers is covered by the bottom of the hopper $e$, which bottom is elevated in the centre, and forms two troughs on line with the pairs of rollers $f$ and $g$, $h$ and $i$, and said rollers are at an inclination sufficient for the ear of corn to slide down the same endwise. An apron, $l$, at the end of the hopper, prevents the ears of corn falling over or passing down sidewise, and insures their passing endwise down upon the husking-rollers. I place at the sides of the machine the inclined hopper-boards $m\ m$, the lower edges of which are above the upper surfaces of the rollers $g$ and $i$, and are provided with detaining-strips $n$, that are held by screws passing through slots so that these detainers may be adjusted nearer to or farther from the rollers $f$ and $h$, according to the size of ears to be operated on. I prefer that at the lowest end these detainers be adjusted to the size of the smallest ears, and at the upper end be sufficiently far away to allow the largest ears to rest upon the rollers $g$, $h$, or $i$, and against the roller $f$ or $h$. Above the rollers $f\ g\ h\ i$, and across between the hopper-boards $m\ m$, I place guards $o$, formed of rollers or strips of wood, beneath which the ears pass, and which prevent the ears turning up endwise as they pass down upon the rollers and are husked. Between and above the rollers $f$ and $h$, I apply the revolving bar $k$, that is introduced to prevent ears passing into the space between said rollers $f$ and $h$, and said bar should be polygonal or have projections upon it to aid in throwing off to either side ears that may come into contact with it. Beneath the rollers $f\ g\ h\ i$ are stripping-bars or knives $q$, that are made adjustable at their ends by screws so as to keep the edge of said knife or bar in contact with the respective roller. These bars or knives strip any silk or husk from the rollers and prevent the same accumulating and winding upon either of these rollers. These stripping-bars or knives may be applied to all or either of the husking-rollers. The rollers $f$ and $h$ are to be corrugated or formed with longitudinal or spiral grooves to aid more effectually in stripping off the husks, as said corrugations will loosen the husk by contact and allow the rollers more quickly to nip or catch any projecting portions of the husk, and thus commence and effect the husking operation. Furthermore, the action of the rollers $f$ and $h$ is to give a revolving motion to the ears, because the detaining-strips $n$ partially lift the ears from the rollers $g$ and $i$, allowing the rollers $f$ and $h$ to act on one side to press down the said ears and revolve them, stripping off the husks with rapidity and certainty, and without shelling the corn from the cob.

The devices before set forth have been applied to my machine to operate in the manner specified, and practically remove the difficulties that have heretofore been experienced in this class of machines.

What I claim, and desire to secure by Letters Patent, is—

1. I claim forming the hopper with an inclined bottom, having a central elevated portion that forms two troughs on line with the pairs of husking-rollers $f$ and $g$, $h$ and $i$, so as to insure the delivery of the ears endwise to such pairs of husking-rollers, as specified.

2. I claim placing the rollers $f$ and $h$ higher than the rollers $g$ and $i$, so as to insure the rotation of the ears as they pass endwise along such pairs of rollers as set forth.

3. I claim the revolving bar $k$, applied above the rollers $f$ and $h$, to prevent ears of corn passing down the space between these rollers and escaping unhusked, as set forth.

4. I claim a series of inclined husking-rollers, arranged substantially as shown, and formed with elastic grooved surfaces to one or both rollers of each pair, for the purposes set forth.

5. I claim the adjustable detaining-strips $n$, applied in the manner specified, in combination with the pairs of inclined husking-rollers for the purposes set forth, 6. I claim the stripping-bars or knives $q$, fitted adjustably as set forth, in combination with the pairs of husking-rollers, arranged as set forth.

7. I claim the combination of the guards $o$, inclined husking-rollers, hopper-boards $m$, and bar $k$ to insure the proper position of the ear in passing endwise down upon the inclined husking-rollers, as set forth.

In witness whereof I have hereunto set my signature this fifteenth day of March, A. D. 1867.

SILAS R. KENYON.

Witnesses:
   GEO. D. WALKER,
   CHAS. H. SMITH.